C. SEYBOLD.
MACHINE ELEMENT.
APPLICATION FILED AUG. 3, 1914.
1,207,227.
Patented Dec. 5, 1916.
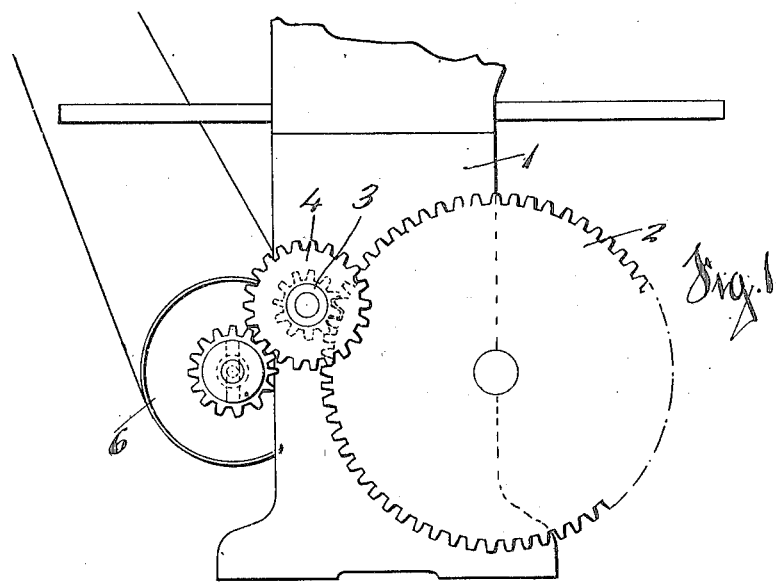
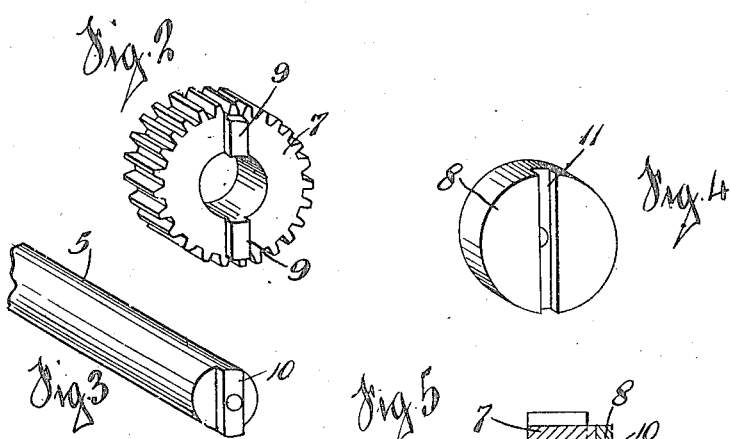

UNITED STATES PATENT OFFICE.

CHARLES SEYBOLD, OF DAYTON, OHIO.

MACHINE ELEMENT.

1,207,227.   Specification of Letters Patent.   Patented Dec. 5, 1916.

Application filed August 3, 1914. Serial No. 854,651.

*To all whom it may concern:*

Be it known that I, CHARLES SEYBOLD, a citizen of the United States, and a resident of the city of Dayton, in the county of Montgomery and State of Ohio, have invented certain new and useful Improvements in Machine Elements, of which the following is a full, clear, and exact description, reference being had to the accompanying drawings, forming part of this specification.

The object of my invention is to provide a means to prevent breakage of machine mechanism in cases in which power driven machines are at times subjected to unusual or extraordinary strain and there is liability of some expensive or important part of the mechanism breaking under the strain.

I have applied my invention particularly to paper cutting machinery in which there is sometimes liability of over-straining the gearing and other operating mechanism, but the invention is, of course, equally applicable to other power driven machinery as will be readily understood.

The invention consists of that certain novel construction to be hereinafter particularly pointed out and claimed, whereby any shaft and driving pulleys employed to transmit the power to the machine mechanism shall be coupled to the driven elements of the machine mechanism by means of a grooved washer which is intentionally the weakest piece in the train of mechanism, so that the washer will break and cut off the driving power before any further damage can be done under undue strains.

In the drawings, Figure 1 is a side elevation of a portion of a machine showing part of a side standard with driving gears with my invention applied thereto. Figs. 2, 3 and 4 are perspective views respectively of a driving pinion, a driving shaft and a grooved washer embodying my invention, taken separately. Fig. 5 is a longitudinal section of the same parts assembled.

As the invention is applicable to a great variety of machines, I have not endeavored to illustrate any complete machine. A portion of a side standard for a machine is indicated at 1, with partial train of driving gears and pinions 2, 3 and 4, suitably journaled in the frame. The main driving shaft 5 is driven in any suitable way as by belt and pulley 6, and the driving power is applied to the machine through the driving pinion 7 mounted on the shaft 5.

The pinion is keyed to the shaft by the grooved washer 8. The tenons 9, 9, on the pinion are brought into alinement with the tongue or tenon 10 on the end of the shaft, and the washer 8 with its groove 11 is then placed over the end of the shaft with its groove engaging the tenons, and the washer is held in place by the screw 12. This washer 8 is purposely made the weakest piece in the machine, and therefore if there is any undue strain thrown on the mechanism this washer will break and thus uncouple the power shaft 5. Under normal conditions, however, the grooved washer is amply sufficient to lock the pinion 7 to the shaft, but as soon as the washer breaks, the pinion, which otherwise is mounted loosely on the shaft, allows the driving shaft to turn freely.

Having thus described my invention, what I claim as new and desire to secure by Letters Patent, is:—

1. In a power driven machine, a shaft, provided with an elongated lug on the end thereof, a gear for transmitting power to said shaft mounted on the shaft, the gear provided with lugs on the face thereof, said lugs being in line with each other, and a breakable washer having a single groove to engage the gear lugs and the shaft lug, and means for securing the washer against the end of the shaft.

2. In a power driven machine, a shaft, a gear revoluble on the shaft, said shaft at its end provided with a transverse lug, the gear having lugs on the face thereof of a shape and length to form a continuation from both ends of the shaft lug when the gear is at the end of the shaft, and a washer having a single slot to engage said lugs, and having means for mounting it against the end of the shaft.

CHARLES SEYBOLD.

Witnesses:
WM. F. KINZELER,
R. R. MYERS.